United States Patent
Leck et al.

(10) Patent No.: US 7,560,044 B2
(45) Date of Patent: Jul. 14, 2009

(54) COMPOSITIONS AND METHODS FOR REDUCING FIRE HAZARD OF FLAMMABLE REFRIGERANTS

(75) Inventors: Thomas J. Leck, Hockessin, DE (US); Howard S. Hammel, Bear, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 112 days.

(21) Appl. No.: 10/987,250

(22) Filed: Nov. 12, 2004

(65) Prior Publication Data

US 2005/0242323 A1   Nov. 3, 2005

Related U.S. Application Data

(60) Provisional application No. 60/519,689, filed on Nov. 13, 2003.

(51) Int. Cl.
*C09K 5/04* (2006.01)
(52) U.S. Cl. .......................................... 252/68; 252/67
(58) Field of Classification Search .................. 252/67, 252/68
See application file for complete search history.

(56) References Cited

U.S. PATENT DOCUMENTS

| | | | |
|---|---|---|---|
| 4,623,475 A | 11/1986 | Enjo et al. | |
| 5,360,566 A | 11/1994 | Stevenson | |
| 5,605,647 A | 2/1997 | Nimitz et al. | |
| 5,611,210 A | 3/1997 | Nimitz et al. | |
| 5,900,185 A | 5/1999 | Tapscott | |
| 5,966,949 A * | 10/1999 | Futagami et al. | 62/114 |
| 6,190,574 B1 * | 2/2001 | Nakagawa et al. | 252/68 |
| 6,270,689 B1 | 8/2001 | Nimitz | |
| 6,300,378 B1 | 10/2001 | Tapscott | |
| 6,423,673 B1 | 7/2002 | Owens et al. | |
| 6,478,979 B1 | 11/2002 | Rivers et al. | |
| 2003/0178597 A1 | 9/2003 | Cho | |

FOREIGN PATENT DOCUMENTS

| | | |
|---|---|---|
| DE | 19814238 A1 | 7/1999 |
| EP | 0 451 692 A2 | 10/1991 |
| WO | WO 02/46328 A2 * | 6/2002 |
| WO | WO 2004/037752 A2 | 5/2004 |

OTHER PUBLICATIONS

International Preliminary Report on Patentability, date of mailing: Jan. 26, 2006.
Robert E. Tapscott, J. Douglas Mather, "Tropodegradable Fluorocarbon Replacements for Ozone-Depleting and Global-Warming Chemicals"; Journal of Fluorine Chemistry 101 (2000) 209-213.
International Search Report, date of mailing: Apr. 21, 2005.
Written Opinion of the International Searching Authority, date of mailing: Apr. 21, 2005.

* cited by examiner

*Primary Examiner*—John R Hardee

(57) ABSTRACT

The present invention relates to compositions comprising flammable refrigerant, fire hazard-reducing agent, and optionally a lubricant suitable for use in a refrigeration or air conditioning apparatus. Further, the present invention relates to compositions comprising lubricant and fire hazard-reducing agent and methods for reducing flammability of flammable refrigerant, for delivering a fire hazard-reducing agent to a refrigeration or air conditioning apparatus, and for replacing a non-flammable refrigerant with a flammable refrigerant.

25 Claims, No Drawings

COMPOSITIONS AND METHODS FOR REDUCING FIRE HAZARD OF FLAMMABLE REFRIGERANTS

CROSS REFERENCE(S) TO RELATED APPLICATION(S)

This application claims the priority benefit of U.S. Provisional Application 60/519,689, filed Nov. 13, 2003.

FIELD OF THE INVENTION

The present invention relates to refrigerant compositions comprising fire hazard-reducing agents. The compositions of the present invention are suitable replacements for non-flammable, refrigerant compositions, including the refrigerants used in automobile air conditioning systems.

BACKGROUND OF THE INVENTION

Hydrofluorocarbon (HFC) refrigerants have become widely used in refrigeration and air-conditioning apparatus throughout the world. HFCs became the refrigerant of choice as first chlorofluorocarbons and now hydrochlorofluorocarbons have been phased out due to their deleterious effect on the ozone layer. HFC refrigerants were developed as intermediate replacements, but some have been identified as having high global warming potential (GWP). New regulations relating to GWP are being adopted thereby requiring the industry to move to alternative refrigerants having an acceptable GWP.

Several types of molecules have been in use or proposed for use in place of the high GWP refrigerants. Many low GWP alternative refrigerants have issues related to toxicity or flammability. The industry has avoided the use of flammable refrigerants in many regions in the world due to the safety factor particularly with respect to consumer products used in homes and automobiles.

It is the object of the present invention to identify means by which flammable refrigerants could be used as replacements for the higher global warming refrigerants currently in use. If currently available flammable refrigerants are used in place of existing refrigerants, the cost of this conversion can be minimized and the ultimate savings will be to the consumer.

Many of the refrigerant blends being sold to replace CFCs or HCFCs have been formulated such that they are non-flammable. But it is often the non-flammable component of the blend that contributes most to the blend's GWP. The higher number of fluorine atoms on the molecule reduces the flammability, but also increases the GWP. The more flammable HFCs have a lower number of fluorines (and thus lower GWP), but the corresponding increase in the number of hydrogens yields a flammable compound.

The art discloses many compositions as having particular utility in the refrigeration and air-conditioning industry due to their non-flammable nature. Many of these compositions are made non-flammable by way of dilution of the flammable component with a known non-flammable refrigerant.

The present invention addresses flammability of the entire refrigerant composition. Often times, the lubricant, which is necessary in most vapor compression refrigeration or air-conditioning systems, is combustible. The present invention addresses this issue by providing compositions that have reduced overall flammability when considering both the refrigerant and the refrigerant/lubricant compositions as compared to those compositions available at present.

BRIEF SUMMARY OF THE INVENTION

The present invention relates to a composition comprising: at least one flammable refrigerant; at least one fire hazard-reducing agent. The composition may also comprise a lubricant suitable for use with refrigeration or air-conditioning apparatus.

The present invention further relates to a composition comprising: a fire hazard-reducing agent and a lubricant suitable for use with refrigeration or air conditioning apparatus.

A further disclosure of the present invention is a method for delivering a fire hazard-reducing agent into a refrigeration or air conditioning apparatus, said method comprising: combining said agent with a refrigerant suitable for use in refrigeration or air conditioning apparatus; or combining said agent with a lubricant suitable for use in refrigeration or air conditioning apparatus; or introducing said agent into said refrigeration or air conditioning apparatus.

Also disclosed herein is a method for reducing fire hazard in or in the vicinity of a refrigeration or air conditioning apparatus, said method comprising: combining a fire-reducing agent with a flammable refrigerant; or combining fire-reducing agent with a lubricant; and introducing either combination into a refrigeration or air conditioning apparatus.

Also disclosed herein is a method of using a fire hazard-reducing agent in refrigeration or air conditioning apparatus, said method comprising: combining said agent with a flammable refrigerant suitable for use in refrigeration or air conditioning apparatus; or combining said agent with a lubricant suitable for use in refrigeration or air conditioning apparatus; or introducing said agent into refrigeration or air conditioning apparatus.

Another embodiment of the present invention is a composition, said composition being suitable for replacing non-flammable refrigerant in refrigeration or air conditioning apparatus, comprising: flammable refrigerant; fire-hazard reducing agent; and optionally a lubricant.

Yet another embodiment of the present invention is a method for replacing a non-flammable refrigerant with a flammable refrigerant in a refrigeration or air conditioning apparatus, said method comprising adding a fire hazard-reducing agent to said flammable refrigerant.

DETAILED DESCRIPTION OF THE INVENTION

The present invention relates to compositions and methods that are useful to reduce fire-hazard in refrigerant compositions, in refrigeration and/or air conditioning systems, or in the vicinity of such systems. Flammable refrigerants of the present invention comprise any compound which may be demonstrated to propagate a flame under specified conditions of temperature, pressure and composition when mixed with air. Flammable refrigerants may be identified by testing under conditions specified by ASHRAE (American Society of Heating, Refrigerating and Air-Conditioning Engineers, Inc.) Standard 34-2001, under ASTM (American Society of Testing and Materials) E681-85, except that the ignition source shall be an electrically activated kitchen match head. Such tests of flammability are conducted with the refrigerant at 101 kPa (14.7 psia) and 21° C. (70° F.) at various concentrations in air in order to determine the lower flammability limit (LFL) and upper flammability limit (UFL) of the test compound in air.

In practical terms, a refrigerant may be classified as flammable if upon leaking from a refrigeration or air conditioning apparatus, and contacting an ignition source a fire may result. The compositions of the present invention, during such a leak, have a lower probability of causing a fire.

Flammable refrigerants of the present invention include hydrofluorocarbons (HFCs), fluoroethers, hydrocarbon ethers, hydrocarbons, ammonia and mixtures thereof. Representative HFC refrigerants include but are not limited to: difluoromethane (HFC-32), fluoromethane (HFC-41), 1,1,1-trifluoroethane (HFC-143a), 1,1,2-trifluoroethane (HFC-143), 1,1-difluoroethane (HFC-152a), fluoroethane (HFC-161), 1,1,1-trifluoropropane (HFC-263fb), and mixtures thereof. HFC refrigerants are commercial products available from a number of sources such as E. I. du Pont de Nemours & Co. (DuPont) Wilmington, Del., 19898, USA, or are available from custom chemical synthesis companies such as PCR Inc., P.O. Box 1466, Gainesville, Fla., 32602, USA, and additionally by synthetic processes disclosed in art such as The Journal of Fluorine Chemistry, or Chemistry of Organic Fluorine Compounds, edited by Milos Hudlicky, published by The MacMillan Company, New York, N.Y., 1962.

Flammable refrigerants of the present invention further comprise fluoroethers, compounds similar to hydrofluorocarbons, which also contain at least one ether group oxygen atom. A representative fluoroether refrigerants includes but is not limited to $C_4F_9OC_2H_5$ (3M™, St. Paul, Minn.).

Flammable refrigerants of the present invention further comprise hydrocarbon refrigerants. Representative hydrocarbon refrigerants include but are not limited to propane, propylene, cyclopropane, n-butane, isobutane, and n-pentane. Hydrocarbon refrigerants are readily available from multiple commercial sources.

Flammable refrigerants of the present invention further comprise hydrocarbon ethers, such as dimethyl ether (DME) sold by DuPont, Wilmington, Del.

Flammable refrigerants of the present invention further comprise ammonia ($NH_3$), which is readily available from multiple commercial sources.

Flammable refrigerants of the present invention may further comprise mixtures of more than one refrigerant such as a mixture of two flammable refrigerants (eg. two HFCs or an HFC and a hydrocarbon) or a mixture comprising a flammable refrigerant and a non-flammable refrigerant, such that the overall mixture is still considered to be a flammable refrigerant.

Examples of non-flammable refrigerants that may be combined with other refrigerants of the present invention include R-134a, R-23, R125, R-236fa, R-245fa, and mixtures of HCFC-22/HFC-152a/HCFC-124 (known by the ASHRAE designations, R-401A, R-401B, and R-401C), HFC-125/HFC-143a/HFC-134a (known by the ASHRAE designation, R-404A), HFC-32/HFC-125/HFC-134a (known by ASHRAE designations, R-407A, R-407B, and R-407C), HCFC-22/HFC-143a/HFC-125 (known by the ASHRAE designation, R-408A), HCFC-22/HCFC-124/HCFC-142b (known by the ASHRAE designation: R-409A), HFC-32/HFC-125 (R-410A), and HFC-125/HFC-143a (known by the ASHRAE designation: R-507) and carbon dioxide.

Examples of mixtures of more than one flammable refrigerant include propane/isobutane; HFC-152a/isobutane, R32/propane; R32/isobutane; HFC-32/ammonia, HFC-125/ammmonia and HFC-32/HFC-125/ammonia and HFC/carbon dioxide mixtures such as HFC-152a/$CO_2$.

By fire hazard-reducing agent is meant any additive which upon addition to a flammable refrigerant or flammable refrigerant/lubricant composition reduces the flammability of the composition as determined and defined by the methods and standards described previously herein. In a practical sense, refrigerant that may leak from an air conditioning or refrigeration system is one major concern when considering flammability. Should a leak occur in a refrigeration system, refrigerant and potentially a small amount of lubricant may be released from the system. If this leaking material may come in contact with an ignition source, a fire may result. The fire hazard-reducing agents of the present invention reduce the probability of a fire in the event of a leak and/or reduce the degree of fire hazard by reducing the temperature or size of any flame produced.

Fire hazard-reducing agents of the present invention comprise salts (e.g. acetates, borates, carbonates, bicarbonates, phosphates, nitrates, hydroxides, oxides, molybdates, bromides, bromates, chlorates, chlorides, or iodides), phosphorous compounds including phosphate esters, organic phosphonates, and phosphonium salts, boric acid, organic boron compounds, brominated compounds, chlorinated paraffins, ammonium polyphosphates, melamines, mixtures of water with polyalkylene glycols or polyol esters, perfluorinated lubricants, fluoroketones, fluoroiodo compounds, or mixtures thereof.

Representative fire-hazard reducing salt agents of this type include but are not limited to: sodium acetate ($CH_3CO_2Na$), potassium acetate ($CH_3CO_2K$), potassium carbonate ($K_2CO_3$), iron (II) carbonate ($FeCO_3$), sodium carbonate ($Na_2CO_3$), ammonium carbonate (($NH_4)_2CO_3$), sodium bicarbonate ($NaHCO_3$), potassium bicarbonate, ($KHCO_3$), ammonium phosphate (($NH_4)_3PO_4$), potassium nitrate ($KNO_3$), sodium chloride ($NaCl$), potassium chloride ($KCl$), cobalt chloride ($COCl_2$), rubidium chloride ($RbCl$), titanium chloride ($TiCl_4$), sodium bromide ($NaBr$), potassium bromide ($KBr$), rubidium bromide ($RbBr$), potassium iodide ($KI$), rubidium iodide ($RbI$), magnesium hydroxide ($Mg(OH)_2$), aluminum hydroxide ($Al(OH)_3$), zinc borate ($3ZnO:2B_2O_3$), zinc oxide ($ZnO$), zinc molybdate ($ZnMoO_4$), calcium molybdate ($CaMoO_4$), copper oxides, ($Cu_2O$ and $CuO$), and antimony oxides, including but not limited to antimony trioxide ($Sb_2O_3$) and antimony pentoxide ($Sb_2O_5$), and others. Such salts are available from many chemical suppliers such as Aldrich, Milwaukee, Wis.

Fire hazard-reducing agents of the present invention further comprise phosphorus compounds. Such phosphorus compounds include phosphate esters, including but not limited to: trialkyl phosphates, triaryl phosphates, mixed alkyl-aryl phosphates (alkyldiaryl, dialkylaryl or alkylated aryl), and cyclic phosphates. Representative trialkyl phosphates include: trimethyl phosphate (($CH_3)_3PO_4$, Cas reg. no. 512-56-1); triethyl phosphate (($CH_3CH_2)_3PO_4$, Cas reg. no. 78-40-0); tributyl phosphate (($C_4H_9)_3PO_4$, CAS reg. no. 126-73-8); trioctyl phosphate (($C_8H_{17})_3PO_4$, CAS reg. no. 1806-54-8); and tri(2-ethylhexyl)phosphate (($CH_3CH(C_2H_5)(CH_2)_4)_3PO_4$, CAS reg. no. 78-42-2). Representative triaryl phosphates include: triphenyl phosphate (($C_6H_5O)_3PO$, CAS reg. no. 115-86-6); tricresyl phosphate (TCP, ($CH_3C_6H_4O)_3PO$, CAS reg. no. 1330-78-5); and trixylenyl phosphate ((($CH_3)_2C_6H_3O)_3PO$, CAS reg. no. 25155-23-1). Representative mixed alkyl-aryl phosphates include: isopropylphenyl phenyl phosphate (IPPP, ($C_6H_5O)_2(($CH_3)_2CHO)PO$, CAS reg. no. 68782-95-6) and bis(t-butylphenyl)phenyl phosphate (TBPP, ($C_6H_5O)_2(($CH_3)_3C)PO$, CAS reg. no. 65652-41-7). Such phosphorus compounds are available from multiple chemical suppliers such as Aldrich (Milwaukee, Wis.); Alfa Aesar (Ward Hill, Mass.); or Akzo Nobel (Amhem, the Netherlands). Additional representative phosphorus compounds are Syn-O-Ad 8784, a butylated triphenyl phosphate from Akzo Nobel (Arnhem, the Netherlands); Durad 620, a tert-butylated triphenyl phosphate from Great Lakes Chemical Corporation (GLCC, West Lafayette, Ind.); and Durad 220 and 110, iso-propylated triphenyl phosphates also from GLCC.

Fire hazard-reducing agents of the present invention further comprise organic phosphonates and phosphonium salts. Representative organic phosphonates and phosphonium salts include: tris monochloropropyl phosphate (TMCPP, different isomers, tris(2-chloroisopropyl)phosphate, Cas reg. no. 13674-84-5, and tris(2-chloropropyl)phosphate, Cas reg. no. 6145-73-9); tris (1,3-dichloro-2-propyl)phosphate (TDCPP, $P(OCH_2OH)_4Cl$, CAS reg. no. 13674-87-8); dimethyl phosphonate ($PHO(OCH_3)_2$, Cas reg no. 868-85-9); and tetrakis (hydroxymethyl)phosphonium chloride ($P(CH_2OH)_4Cl$, CAS reg. No. 124-64-1) among others. These phosphorus compounds are also available from Aldrich, Alfa Aesar, or Akzo Nobel.

Fire hazard-reducing agents of the present invention further comprise other boron compounds such as boric acid ($H_3BO_3$, Cas reg. no. 10043-35-3), triphenyl borane ($B(C_6H_5)_3$, Cas reg. no. 960-71-4) and other boron salts, such as sodium borate.

Fire hazard-reducing agents of the present invention further comprise brominated organic compounds such as hexabromocyclododecane (Cas reg. no. 25637-99-4) or decabromodiphenyl oxide (Cas reg. no. 1163-19-5). The brominated organic compounds of the present invention further include aliphatic compounds such as dibromoneopentyl glycol (DBNPG, $C(CH_2BR)_2(CH_2OH)_2$, Specialchem FR-522, Cas reg. no. 3296-90-0); trisbromoneopentyl phosphate (Specialchem FR-370/FR-372, $(C(CH_2Br)_3CH_2O)PO$, Cas reg. no. 19186-97-1), trisbromoneopentyl alcohol (TBNPA, $CH_2(CH_2Br)OH$, Cas reg. no. 36483-57-5), and hexabromocyclododecane (HBCD, cyclo-(—$CHBrCHBrCH_2CH_2CHBrCHBrCH_2CH_2CHBrCHBrCH_2CH_2$—) Cas reg. no. 25637-99-4).

The brominated organic compounds of the present invention further include aromatic compounds such as decabromodiphenyl oxide (DECA, $O(C_6Br_5)_2$, Specialchem FR-1210, Cas reg. no. 1163-19-5); tris(tribromophenyl)triazine (Cas reg. no. 25713-60-4, Specialchem FR-245); tetrabromobisphenol A bis (2,3-dibromopropyl ether) (Specialchem FR-720, Cas reg. no. 21850-44-2); Octabromodiphenyl oxide (OCTA, Cas reg. no. 32536-52-0, Specialchem FR-1208); tetrabromobisphenol A $(CH_3)_2C(C_6H_2Br_2OH)_2$, Cas reg. no. 79-94-7, Specialchem FR-1524); and brominated trimethylphenyl indan (Cas reg. no. 155613-93-7, Specialchem FR-1808).

The brominated organic compounds of the present invention further include brominated epoxy compounds such as Specialchem F-2016 (oligomer, Cas reg. no. 68928-70-1), among others. All of the aliphatic brominated, aromatic brominated and brominated epoxy compounds listed above are available from Specialchem S. A. (Paris, France).

Fire hazard-reducing agents of the present invention further comprise chlorinated paraffins with 10-30 carbon atoms and having from about 35 weight percent to about 70 weight percent chlorine in the molecule. Chlorinated paraffins of the present invention include The Chlorez®/Hordaresin® flame retardant additives, Doversperse® dispersions and emulsions of resinous and liquid chlorinated paraffins, Doverguard® brominated chlorinated paraffins, Paroil®, and Chlorowax® liquid chlorinated paraffins, all produced by Dover Chemical Corporation (Dover, Ohio). Additionally, chlorinated paraffins of the present invention include Cereclor® 42, 42SS, 48, 70, LCCP 44, and 46 fire retardant chlorinated paraffin waxes and Cereclor® S-45, 51L, S-52, S-52HV, S-55, S-56, S-56B, and MCCP 54 $C_{14}$-$C_{17}$ chlorinated paraffins, all of which are produced by Pioneer (Houston, Tex.).

Fire hazard-reducing agents of the present invention further comprise ammonium polyphosphates (APPs), $[NH_4PO_3]_n$. The ammonium polyphosphates may be straight chained or branched and cross-linked molecules. Ammonium polyphosphates are available coated with silanes, melamines or other substances. The present invention is intended to include coated or uncoated ammonium polyphosphate formulations. Representative of these APP formulations are FR CROS 484 (uncoated), RF CROS 486 (surface reacted silane coating), and FR CROS 484 (surface reacted melamine coating), which are all available from Specialchem S. A. (Paris, France).

Fire hazard-reducing agents of the present invention further comprise mixtures of water with polyalkylene glycols (PAGs) or polyol ester (POEs) lubricants optionally with anti corrosion, antiwear, stabilizer and/or lubricity additives. The formulations with water may comprise 30 weight percent water or more, such as EMKAROX® HV 45 and EMKAROX® HV 20 (PAGs from Uniqema, Gouda, The Netherlands). As the PAG/water and POE/water as described may also function as a lubricant, additional lubricants may not be necessary. Alternatively, additional lubricants may be added to the PAG/water or POE/water mixtures as may be required for lubrication.

Fire hazard-reducing agents of the present invention further comprise perfluorocarbon or perfluoropolyether lubricants. Examples include but are not limited to Krytox® (DuPont, Wilmington, Del.), Fomblin® (Solvay Solexis, Italy), and Demnum™ (offered by Daikin America, Inc., Osaka, Japan). Representative lubricants of this type are Krytox® 1531XP or Krytox® GLP series, Fomblin® Z-Dol, Z-Tetraol, AM 2001, or AM 3001, Demnum™ LR-200 or S-65 and other Demnum™ oils. As said perfluorinated lubricants may also function as a lubricant, no other lubricant may be required in a composition containing said perfluorinated fire hazard-reducing agents. Alternatively, the perfluorinated lubricants may be included as an additive to the other lubricants as described herein.

Fire hazard-reducing agents of the present invention further comprise melamines, including melamine (2,4,6-triamino-1,3,5-triazine, CAS no. 106-78-1) and homologues and derivatives of melamine. Such melamine homologues include multi-ring structures such as melam (1,3,5-triazine-2,4,6-triamine-n-(4,6-diamino-1,3,5-triazine-2-yl), melem (2,5,8-triamino-1,3,4,6,7,9,9b-heptaazaphenalene, CAS no. 1502-47-2), and melon (poly[8-amino-1,3,4,6,7,9,9b-heptaazaphenalene-2,5-diyl)]). Such melamine derivatives include melamine cyanurate and melamine (mono/pyro/poly) phosphates, such as Melapur® MP (melamine monophosphate and Melapur® 200 (a melamine polyphosphate). All these melamines are available from Specialchem S. A. (Paris, France).

Fire hazard-reducing agents of the present invention further comprise fluoroketones. The fluoroketones of the present invention consist of compounds containing fluorine, carbon, at least one ketone group oxygen, and optionally hydrogen. Such fluoroketones may be represented by the formula $R^1COR^2$, wherein $R^1$ and $R^2$ are independently selected from straight or branched chain, saturated or unsaturated, aliphatic or alicyclic partially or fully fluorinated hydrocarbon radicals. Additionally, $R^1$ and $R^2$ may be joined to form a cyclic fluoroketone ring. The fluoroketones may contain from about 2 to 10 carbon atoms. Preferred fluoroketones contain 4 to 8 carbon atoms. The fluoroketones of the present invention may further contain heteroatoms, such as oxygen, thus forming additional ketone groups, ether groups, aldehyde groups, or ester groups. Examples of such fluoroketones are 1,1,1,2,2,4,5,5,5-nonafluoro-4-(trifluoromethyl)-3-pentanone or perfluoroethyl isopropyl ketone (PEIK, CAS reg. no. 756-13-8); 1,1,1,3,4,4,4-heptafluoro-3-(trifluoromethyl)-2-butanone or perfluoromethyl isopropyl ketone (PMIK, Cas reg. no. 756-12-7); 1,1,1,2,4,5,5,5-octafluoro-2,4-bis(trifluoromethyl)-3 pentanone; 1,1,1,2,4,4,5,5-octafluoro-2-(trifluoromethyl)-3-pentanone; 1,1,1,2,4,4,5,5,6,6-undecafluoro-2-(trifluoromethyl)-3-hexanone; and 1,1,2,2,4,5,5,5-octafluoro-1-(trifluoromethoxy)-4-(trifluoromethyl)-3-pentanone. PEIK is available from 3M™ (St. Paul, Minn.) and the other fluoroketones listed may be prepared as described in U.S. Pat. Nos. 3,185,734 and 6,478,979 incorporated herein by reference, and J. Am. Chem. Soc., vol 84, pp. 4285-88, 1962.

Fire hazard-reducing agents of the present invention further comprise fluoroiodo compounds such as trifluoromethyl iodide ($CF_3I$, Cas reg. no. 2314-97-8).

The concentration of fire hazard-reducing agent in the compositions of the present invention will vary depending upon the flammable refrigerant, fire hazard-reducing agent and lubricant employed. The concentration of the fire hazard-reducing agent in any of the compositions of the present invention may be sufficient to reduce flammability to an acceptable level or eliminate the flammability of said composition entirely. The concentration of fire hazard-reducing agent with respect to flammable refrigerant may be from about 1 weight percent to about 50 weight percent in the flammable refrigerant. In compositions of lubricant and fire hazard-reducing agent the concentration of fire hazard-reducing agent may be from about 1 weight percent to about 99 weight percent in the lubricant. In compositions comprising flammable refrigerant, fire hazard-reducing agent and lubricant the concentration of the fire hazard-reducing agent may be from about 0.5 weight percent to about 50 weight percent with respect to the complete composition.

The compositions of the present invention that incorporate liquid components may be prepared by any convenient method to combine the desired amount of the individual components. A preferred method is to weigh the desired component amounts and thereafter combine the components in an appropriate vessel. Agitation may be used, if desired. The fire-hazard reducing agent is charged to a cylinder, to which the liquified (under pressure) refrigerant is added under, under pressure is added. Optionally, the cylinder is permitted to "roll" to achieve mixing of the fire-hazard reducing agent with the flammable refrigerant. Other mixing techniques include shaking, or by employing a roller, a paint mixer, or any suitable device that will achieve mixing of the componens.

Fire hazard-reducing agents of the present invention may form a solution or an emulsion in the flammable refrigerant or the lubricant or may be present as a solid dispersion in said flammable refrigerant or in said lubricant. The particles of the solid phase fire hazard-reducing agent may have median particle size of about 10 micrometers or less. Alternatively, the particles may have median particle size of about 500 nanometers or less, or the particles may be nanoparticles with median particle size of about 100 nanometers or less. The nanosize solid particles contained in such a dispersion are preferred.

The solid dispersions of fire hazard-reducing agent in refrigerant and/or lubricant may be prepared by combining the fire hazard-reducing agent with the refrigerant or lubricant and optionally a dispersant. Depending upon the fire hazard-reducing agent, refrigerant and/or lubricant used, it may be appropriate to combine the dispersant with the refrigerant or lubricant first and subsequently add the fire hazard-reducing agent to the combination. The combination may be milled to reduce particle size and produce a more uniform dispersion, optionally making use of grinding media.

Milling devices of the present invention include any device or method that achieves reduction in the size of particles through a grinding process, optionally utilizing grinding media. The milling device can be any that uses an attritor, a tumbling ball mill, a vibratory ball mill, a planetary ball mill, a bead mill, a horizontal media mill, a vertical media mill, an annular media mill, a rotor-stator or a high pressure jet mill, such as a Microfluidizer® (Microfluidics™, Newton, Mass.). Preferred milling devices for milling of solid phase fire hazard reducing agents in lubricant are ball mills, bead mills or media mills. For milling solid phase fire hazard reducing agents in flammable refrigerants, the milling device would require modification for high pressure, due to the pressure of the compressed gas refrigerants. Preferred of the milling devices for the compositions containing flammable refrigerant is a high pressure media mill as disclosed in U.S. patent application Ser. No. 10/476,312, incorporated herein by reference.

In the instance of air or water sensitive solid phase fire hazard reducing agents, milling of the present invention may involve evacuating gases from the milling device prior to adding of a hydrofluorocarbon to the milling device, and/or purging the milling device with an inert gas prior to adding of a hydrofluorocarbon to said milling device.

The milling step of the present invention optionally uses grinding media, which is added to the milling device prior to milling. Grinding media is generally comprised of any material of greater hardness and rigidity than the particle to be ground. The grinding media can be comprised of almost any hard, tough material including, for example, ceramics such as zirconia; nylon and polymeric resins; metals, and a range of naturally occurring substances, such as sand, silica, or chitin obtained from crab shells. Further, grinding media may either consist entirely of a single material that is tough and resilient, or in the alternative, be comprised of more than one material, i.e., comprise a core portion having a coating of tough resilient material adhered thereon. Additionally, the grinding media may be comprised of mixtures of any materials that are suitable for grinding. Any size of grinding media suitable to achieve the desired particle size can be utilized. However, in many applications the preferred size range of the grinding media will be from about 15 millimeters to about 200 micrometers range for continuous media milling with media retention in the mill. Largely spherical (i.e. close to perfect spheres) media is commonly used, although use of largely cubic (i.e. close to perfect cubes) media is known. Media aspect ratios (ratio of height to width) are commonly near about 1 and seldom exceed about 10. For batch media milling (in attritors) or circulation milling in which slurry and grinding media are circulated, smaller nonspherical grinding media can be often utilized.

The optional dispersants of the present invention may be cationic, amphoteric, nonionic or anionic. The dispersant used in a composition of the present invention will depend on the chemical nature of the different composition components.

The dispersants useful for preparing a dispersion of fire hazard reducing agent in lubricant may be any anionic or non-ionic dispersant, or combinations thereof, found to produce a non-sedimenting dispersion composition when combined with synthetic oils and fine particles of the present invention. Dispersants that display some of the character of ionic or anionic dispersants, such as amphoteric dispersants, may also be used. Either polymeric or non-polymeric dispersants may be used. Combinations of polymeric and non-polymeric dispersants are preferred.

Non-polymeric dispersants are generally molecules with two functionalities, one of which acts to anchor the dispersant to a particle and one which maintains compatibility with the liquid. They generally have molecular weights of less than 1000. Some non-polymeric dispersants have multiple identical segments or groups but these molecules do not regularly repeat segments (such as in polymers) and are generally smaller molecules (less than 1000 MW).

In non-ionic dispersants and anionic dispersants, there is generally a hydrophobic functionality and a hydrophilic functionality. Typical examples of hydrophobic segments include alkyl, aryl, alkaryl, siloxane, polysiloxane, fluoroether, and flouroalkyl groups. In anionic dispersants, the hydrophilic group has anionic character. Examples of these segments include but are not limited to: carboxylates, sulfonates, sulfates, phosphates, phosphonates, quaternary salts, and amine oxides. Other hydrophilic groups included in non-ionic dispersants include, but are not limited to: ethoxylates or alkoxylates and hydroxylates including saccharides.

Examples of non-ionic dispersants that may be used include the C10-C18 N-alkyl polyhydroxy fatty acids and fatty acid amides; C12-C18 alkyl ethoxylates ("AE"-type surfactants), the C10-C18 glycerol ethers, C10-C18 alkyl alkoxy carboxylates, C10-C18 alkyl polyglycosides, and C6-C12 alkyl phenol alkoxylates. These materials are available commercially by various sources. For example, the Triton "X" series, such as X-45, X-100, X-114, and X-102 from Rohm and Haas, are examples of alkyl phenol alkoxylates of various structures.

Examples of anionic dispersants that may be used include C8-C22 primary or secondary alkane sulfonates, sulfonated polycarboxylic acids, alkyl glyceryl sulfonates, alkyl phenol ethylene sulfates, alkyl phosphates, and sulfosuccinates. Anionic dispersants of the present invention are available commercially. Representative sulfosuccinate dispersants are Aerosol OT, (Cytec, West Paterson, N.J.,), Anionyx 12s (Stepan, Northfield, Ill.), Mackanate DOS-100 (Mcintyre, University Park, Ill.), and Monawet MB-100 (Uniqema, New Castle, Del.).

Polymeric dispersants have repeating segments, at least some of which contain functionality for anchoring the dispersant to the surface, and generally have molecular weights exceeding about 1000. They may be homopolymers, where the segments are all the same, or co-polymers, where there are multiple types of segments.

In non-ionic polymeric dispersants, there are generally some segments, which are largely hydrophobic, and others that are largely hydrophilic. In largely non-polar solvents, the hydrophilic portion of the dispersant anchors the dispersant to the particle. In largely polar solvents, the hydrophobic portion of the dispersant anchors the dispersant to the particle. Typical hydrophilic segments include, but are not limited to, ethoxylates or alkoxylates, highly polar ethers, and hydroxylates including saccharides. Typical hydrophobic segments include, but are not limited to, alkyl groups, alkylene groups, aryl groups, aromatic groups, fluorocarbons, silicones, hydrophobic ethers (such as styrene oxide, propylene oxide, butylene oxide, and doecyl glycidyl ether) and hydrophobic polyesters such as methycrylate esters, methacrylate esters, and caprolactone. In some non-ionic polymer dispersants, other anchoring strategies, such as hydrogen bonding, are used and segments are included in the polymers to create this functionality in the dispersant.

In anionic polymeric dispersants, anionic groups including, but not limited to carboxylates, sulfonates, sulfates, phosphates, phosphonates, quaternary salts, and amine oxides are incorporated in the polymer, in addition to other hydrophobic or hydrophilic segments, as described above for non-ionic polymeric dispersants.

Non-ionic dispersants of the present invention may be alkoxylated polyaromatics, 12-hydroxystearic acid and polyhydroxystearic acid. A representative alkoxylated polyaromatic is Solsperse 27000 (Avecia, Manchester, England).

The dispersants useful for preparing a dispersion of fire hazard reducing agent in flammable refrigerant are generally anionic or cationic compounds that contain a hydrophilic moiety and a hydrophobic moiety. These dispersant compounds also may have tails containing polar groups such as alcohols. The dispersant hydrophilic moiety comprises a cationic (e.g., aliphatic ammonium), amphoteric (e.g., amine betaines), nonionic (e.g., oxyalkylene oligomers, sugar alcohols (e.g., sorbitol), polysorbates, polysaccharides) or anionic (e.g., carboxylate, phosphate, sulfate, sulfonate, sulfosuccinate) group. Additional useful dispersants include fluorosurfactants such as DuPont (Wilmington, Del.) Zonyl® brand surfactants and similar compounds sold by 3M™ (St. Paul, Minn.); derivatives of $C_{12}$-$C_{15}$ alcohols; and Propameen group (alkoxylated amines) from Akzo (Chicago, Ill.). Representative dispersants include: phospholipids (e.g., soy lecithin); polysaccharides (e.g., starch, glycogen, agar, carrageenan); polysorbate 80; Span® 85 (sorbitan trioleate (Uniqema)); Pluronics 25R4; Pluronics P104; Phospholan PS 222, a C12-C15 alcohol phophate (from Akzo); and Sulfopon, a C12-C16 fatty alcohol sulfate (from Cognis, Dusseldorf, Germany); Texapon TB, a TEA laurel sulfate (Cognis), and Texapon PNSO-L, a sodium C12-C14 ether sulfate (Cognis).

Lubricants of the present invention comprise those suitable for use with refrigeration or air-conditioning apparatus. Among these lubricants are those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Lubricants of the present invention may comprise those commonly known as "mineral oils" in the field of compression refrigeration lubrication. Mineral oils comprise paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). Lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and napthenes, and poly(alphaolefins). Representative conventional lubricants of the present invention are the commercially available BVM 100 N (paraffinic mineral oil sold by BVA Oils), Suniso® 3GS and Suniso® 5GS (napthenic mineral oil sold by Crompton Co.), Sontex® 372LT (napthenic mineral oil sold by Pennzoil), Calumet® RO-30 (napthenic mineral oil sold by Calument Lubricants), Zerol® 75, Zerol® 150 and Zerol® 500 (linear alkylbenzenes sold by Shrieve Chemicals) and HAB 22 (branched alkylbenzene sold by Nippon Oil).

Lubricants of the present invention further comprise those which have been designed for use with hydrofluorocarbon refrigerants and are miscible with refrigerants of the present invention under compression refrigeration and air-conditioning apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs).

Lubricants of the present invention are selected by considering a given compressor's requirements and the environment to which the lubricant will be exposed. Lubricants of the present invention preferably have a kinematic viscosity of at least about 5 cs (centistokes) at 40° C.

Commonly used refrigeration system additives may optionally be added, as desired, to compositions of the present invention in order to enhance lubricity and system stability. These additives are generally known within the field of refrigeration compressor lubrication, and include anti wear agents, extreme pressure lubricants, corrosion and oxidation inhibitors, metal surface deactivators, free radical scavengers, foaming and antifoam control agents, leak detectants and the like. In general, these additives are present only in small amounts relative to the overall lubricant composition, and are typically used at concentrations of from less than about 0.1% to as much as about 3% of each additive.

These additives are selected on the basis of the individual system requirements. Some typical examples of such additives may include, but are not limited to, lubrication enhancing additives, such as alkyl or aryl esters of phosphoric acid and of thiophosphates. Additionally, the metal dialkyl dithiophosphates (e.g. zinc dialkyl dithiophosphate or ZDDP, Lubrizol 1375) and other members of this family of chemicals may be used in compositions of the present invention. Other antiwear additives include natural product oils and assymetrical polyhydroxyl lubrication additives such as Synergol TMS (International Lubricants). Similarly, stabilizers such as anti oxidants and free radical scavengers may be employed. Water scavengers may be also be employed if the fire-reducing agent that is being used does not comprise water as a component. Compounds in this category can include, but are not limited to, butylated hydroxy toluene (BHT) and epoxides.

The present invention further comprises a method for reducing fire hazard of a flammable refrigerant and/or reducing the fire hazard present in a refrigeration or air-conditioning apparatus, said method comprising introducing the compositions of the present invention into said refrigeration or air-conditioning apparatus. Refrigeration or air-conditioning apparatus include but are not limited to centrifugal chillers, household refrigerator/freezers, residential air-conditioners, automotive air-conditioners, refrigerated transport vehicles, heat pumps, supermarket food coolers and display cases, and cold storage warehouses.

The present invention further comprises a method for reducing fire hazard in or in the vicinity of a refrigeration or air conditioning apparatus, said method comprising:
 (i) combining a fire-reducing agent with a flammable refrigerant; or
 (ii) combining fire-reducing agent with a lubricant; and introducing said combination into a refrigeration or air conditioning apparatus.

The present invention further comprises a composition, said composition being suitable for replacing non-flammable refrigerant in refrigeration or air conditioning apparatus, comprising:
 (i) flammable refrigerant;
 (ii) fire hazard-reducing agent; and
 (iii) optionally a lubricant.

The compositions of the present invention may be suitable as replacements for refrigerant in stationary or mobile refrigeration or air conditioning apparatus. Such replacements may be suitable for use in new equipment, retrofit for existing equipment that may require some modifications or as a drop-in replacement in existing equipment (not requiring any modifications for use). For example, a composition comprising the flammable refrigerant R-32 and a fire-hazard reducing agent may serve as a replacement for R-410A (the ASHRAE designation for the non-flammable refrigerant composition comprised of 50 weight percent R-32 and 50 weight percent R-125). Additionally, a composition comprising the flammable refrigerant R-152a and a fire-hazard reducing agent may serve as a replacement for R-134a.

The present invention further comprises a method of using a fire hazard-reducing agent in refrigeration or air conditioning apparatus, said method comprising:
 (i) combining said agent with a flammable refrigerant suitable for use in refrigeration or air conditioning apparatus; or
 (ii) combining said agent with a lubricant suitable for use in refrigeration or air conditioning apparatus; or
 (iii) introducing said agent into refrigeration or air conditioning apparatus.

The present invention further comprises a method for replacing a non-flammable refrigerant with a flammable refrigerant in a refrigeration or air conditioning apparatus, said method comprising adding a fire hazard-reducing agent to said flammable refrigerant. In the method said non-flammable refrigerant may be R-134a and said flammable refrigerant may be R-152a. Also, said non-flammable refrigerant may be R-410A and said flammable refrigerant may be R-32. The method comprises use of fire hazard-reducing agents as described herein.

EXAMPLES

The following examples are meant to demonstrate the reduced probability of fire occurring should a refrigerant composition containing a flammable refrigerant and a fire hazard reducing agent leak from a refrigeration or air conditioning apparatus. An apparatus was constructed to perform measurements and to allow observations of flame characteristics based upon ASTM Test Method D 3065-94, a Standard Test for Flammability of Aerosols. The ASTM test was modified by using a gas torch as an ignition source, in order to increase the stability and reproducibility of the test.

In this test, the material to be tested was charged to a pressurized vessel that had been fitted with a metered discharge valve and a precision spray nozzle having a diameter of 0.016 inches. The valve and nozzle assembly allowed a discharge rate of about 1.1 to 1.2 grams per second of the mixture charged to the vessel, as a finely dispersed aerosol mist.

In each test, the composition to be tested was discharged through the nozzle and across the same gas burner flame. The length of the burning plume of the escaping gas mixture was measured, as well as the flame quality, as determined by color, intensity, and cross sectional shape or size of the flame.

In the following examples, PEIK is perfluoroethylisopropyl ketone (1,1,1,2,2,4,5,5,5-nonafluoro-4-(trifluoromethyl)-3-pentanone, CAS reg. no. 756-13-8) from $_3$M™ (St. Paul, Minn.). Syn-O-Ad 8784 is a butylated triphenyl phosphate from Akzo Nobel (Arnhem, the Netherlands). Durad 620 is a tert-butylated triphenyl phosphate from Great Lakes Chemical Corporation (GLCC, West Lafayette, Ind.). Durad 220 and 110 are iso-propylated triphenyl phosphates also from GLCC. Trifluoromethyl iodide is $CF_3I$, and is available from Aldrich Chemical (Milwaukee, Wis.).

Example 1

Baseline flame characteristics were established by discharging pure flammable refrigerant, HFC-152a (DuPont, Wilmington, Del.) into the ignitor flame and recording the flame characteristics. Following the establishment of the baseline, a combination of refrigerant and fire hazard-reducing agent was discharged as an aerosol into the ignitor flame. The resulting flame, if present, was observed and the flame characteristics recorded. The results are shown in Table 1 below.

TABLE 1

| Refrigerant, concentration (wt %) | Fire Hazard-Reducing Agent, concentration (wt %) | Flame Length (inches) | Flame Quality | Observations |
|---|---|---|---|---|
| HFC-152a, 100 | none | 12 | mild, light-blue flame | baseline - HFC only |
| HFC-152a, 91 | PEIK, 9 | 2 | very faint, blue flame | substantial reduction of flame |
| HFC-152a, 90 | PEIK, 10 | 1 | very faint, blue flame | substantial reduction of flame |
| HFC-152a, 80 | PEIK, 20 | no flame | no flame | elimination of flame |
| HFC-152a, 91 | Syn-O-Ad 8784, | 3 | weak, yellow flame | substantial reduction of flame |
| HFC-152a, 50 | Durad 620, 50 | 4 | weak, yellow flame | substantial reduction of flame |
| HFC-152a, 91 | Durad 620, 9 | 6 | yellow flame | substantial reduction of flame |
| HFC-152a, 91 | Durad 220, 9 | 6.5 | bushy, yellow flame | substantial reduction of flame |
| HFC-152a, 91 | Durad 110, 9 | 6.5 | bushy, yellow flame | substantial reduction of flame |

The results show the flame length and intensity are reduced, and in one case the flame eliminated, by addition of fire hazard reducing agent to refrigerant HFC-152a.

Example 2

Baseline flame characteristics were established by discharging a mixture of refrigerant and lubricant, HFC-152a and UCON® RL-488 PAG lubricant (Dow Chemical Corporation, Midland, Mich.), into the ignitor flame and recording the flame characteristics. Following the establishment of the baseline, a combination of HFC-152a, PAG and fire hazard-reducing agent was discharged as an aerosol into the ignitor flame. The resulting flame, if present, was observed and the flame characteristics recorded. The results are shown in Table 2 below.

Antimony pentoxide was introduced to the test mixture as a dispersion in PAG lubricant. The antimony pentoxide ($Sb_2O_5$) dispersion was prepared in a laboratory media mill consisting of a baffled beaker filled with spherical ceramic media (0.4-0.6 mm diameter). The agitator blade was rotated at a tip speed of 10 meters/second by the use of a motor and shaft to create shear within the media. Thirty grams of antimony pentoxide powder, A1588LP from Nyacol® Corporation (Ashland, Mass.), was added to 120 grams of RL-488 PAG lubricant in the baffled media mill and the slurry was agitated for about 2 hours. The resulting dispersion was 20 weight percent (wt %) $Sb_2O_5$ in PAG.

Iron carbonate was also introduced to the test mixture as a dispersion in PAG lubricant. The iron carbonate ($FeCO_3$) dispersion was prepared using the same procedure described above for the antimony pentoxide dispersion. The resulting dispersion was 16 weight percent $FeCO_3$ in PAG.

TABLE 2

| Refrigerant, conc. lubricant, conc. (wt %) | Fire hazard-reducing agent, concentration (wt %) | Flame Length (inches) | Flame Quality | Observations |
|---|---|---|---|---|
| HFC-152a, 90 PAG RL-488, 10 | None | 18 | blue, bushy, 4 to 6 inches diameter | baseline with PAG lubricant |
| HFC-152a, 90 PAG RL-488, 8.0 | $Sb_2O_5$ A1588P, 2.0 | 16 | yellow, 3 inch diameter weak flame | significant reduction of flame |
| HFC-152a, 90 PAG RL-488, 8.4 | $FeCO_3$, 1.6 | 4 | yellow flame | substantial reduction of flame |
| HFC-152a, 80 PAG RL-488, 10 | Syn-O-Ad 8784, 10 | 2 | weak yellow flame | substantial reduction of flame |
| HFC-152a, 70 PAG RL-488, 10 | Syn-O-Ad 8784, 10 $CF_3I$, 10 | 2 | very indistinct weak flame | substantial reduction of flame |
| HFC-152a, 70 PAG RL-488, 10 | $CF_3I$, 20 | no flame | no flame | elimination of flame |
| HFC-152a, 90 PAG RL488, 5 | PEIK, 5 | 3 | faint blue, yellow tipped flame | substantial reduction of flame |
| HFC-152a, 80 PAG RL-488, 10 | PEIK, 10 | no flame | no flame | elimination of flame |
| HFC-152a, 70 PAG RL-488, 20 | PEIK, 10 | 1 | very weak flame | substantial reduction of flame |

The results show the flame length and intensity are reduced, and in two cases the flame is eliminated, by addition of fire hazard reducing agent to HFC-152a and PAG RL-488.

What is claimed is:

1. A method for reducing fire-hazard in or in the vicinity of a refrigeration or air conditioning apparatus comprising introducing into said apparatus a composition comprising:
   (i) at least one flammable hydrofluorocarbon refrigerant;
   (ii) at least one phosphate ester fire reducing agent; and
   (iii) at least one additional fire hazard reducing agent comprising at least one carbonate salt.

2. The method of claim 1 wherein said composition further comprises an additional refrigerant selected from the group consisting of fluoroethers, hydrocarbon ethers, hydrocarbons, carbon dioxide, ammonia and mixtures thereof.

3. The method of claim 1, wherein said flammable hydrofluorocarbon refrigerant is a mixture, said mixture further comprising at least one non-flammable refrigerant.

4. The method of claim 1 wherein said composition further comprises at least one lubricant suitable for use with refrigeration or air-conditioning apparatus.

5. The method of claim 1 wherein said composition further comprises at least one additive selected from the group consisting of anticorrosion, antiwear, stabilizer and lubricity additives.

6. A method for reducing fire-hazard in or in the vicinity of a refrigeration or air conditioning apparatus comprising introducing into said apparatus a composition comprising:
   (i) a phosphate ester fire hazard-reducing agent suitable for use with a flammable hydrofluorocarbon refrigerant;
   (ii) a lubricant suitable for use with refrigeration or air conditioning apparatus; and
   (iii) at least one additional fire hazard-reducing agent comprising at least one carbonate salt.

7. The method of claim 4 or 6 wherein said lubricant is selected from the group consisting of mineral oils, paraffins, naphthenes, synthetic paraffins, alkylbenzenes, poly-alpha-olefins, polyalkylene glycols, polyvinyl ethers, polyol esters and mixtures thereof.

8. The method of claim 1 or 6, wherein said composition further comprises at least one additional fire hazard reducing agent selected from the group consisting of acetates, borates, bicarbonates, phosphonates, nitrates, hydroxides, oxides, molybdates, bromides, bromates, chlorates, chlorides, iodides, organic phosphonates, phosphonium salts, boric acid, organic boron compounds, brominated compounds, chlorinated paraffins, ammonium polyphosphates, melamines, mixtures of water with polyalkylene glycols or polyol esters, perfluorinated lubricants, fluoroketones, fluoroiodo compounds, and mixtures thereof.

9. The method of claim 1 or 6 wherein said phosphate ester fire hazard-reducing agent is an alkylated triaryl phosphate.

10. The method of claim 1 or 6 wherein said phosphate ester fire hazard-reducing agent is a butylated triphenyl phosphate.

11. The method of claim 1 or 6 wherein said phosphate ester fire hazard-reducing agent is an isopropylated triphenyl phosphate.

12. A method for replacing a non-flammable refrigerant with a flammable hydrofluorocarbon refrigerant in a refrigeration or air conditioning apparatus, said method comprising adding a phosphate ester fire-hazard reducing agent to said flammable refrigerant, further comprising adding at least one additional fire-hazard reducing agent comprising a carbonate salt.

13. The method of claim 12 wherein said non-flammable refrigerant comprises R-134a.

14. The method of claim 12 wherein said flammable hydrofluorocarbon refrigerant comprises R-152a.

15. The method of claim 12 wherein said non-flammable refrigerant R-134a is replaced by said flammable hydrofluorocarbon refrigerant comprising R-152a.

16. The method of claim 12 wherein said non-flammable refrigerant comprises R-410A.

17. The method of claim 12 wherein said flammable hydrofluorocarbon refrigerant comprises R-32.

18. The method of claim 12 wherein said non-flammable refrigerant R-410A is replaced by said flammable hydrofluorocarbon refrigerant comprising R-32.

19. The method of claim 12 wherein said refrigeration or air conditioning apparatus is a stationary refrigeration or air conditioning apparatus.

20. The method of claim 12 wherein said refrigeration or air conditioning apparatus is a centrifugal chiller, household refrigerator or freezer, residential air conditioner, supermarket food cooler, supermarket display case, or cold storage warehouse.

21. The method of claim 12 wherein said refrigeration or air conditioning apparatus is a mobile refrigeration or air conditioning apparatus.

22. The method of claim 12 wherein said refrigeration or air conditioning apparatus is an automotive air conditioner or a refrigerated transport vehicle.

23. The method of claim 12 wherein said non-flammable refrigerant R-134a is replaced by said flammable hydrofluorocarbon refrigerant R-152a in an automotive air conditioner.

24. The method of claim 12 wherein said non-flammable refrigerant R-134a is replaced by said flammable hydrofluorocarbon refrigerant R-152a combined with at least one phosphate ester fire-hazard reducing agent in an automotive air conditioner.

25. The method of claim 12 wherein said non-flammable refrigerant R-134a is replaced by said flammable hydrofluorocarbon refrigerant R-152a combined with at least one phosphate ester fire-hazard reducing agent and at least one carbonate salt in an automotive air conditioner.

* * * * *